May 23, 1933.   H. BOLAS ET AL   1,910,423
AMPHIBIAN AIRCRAFT
Filed Feb. 24, 1930   2 Sheets-Sheet 1
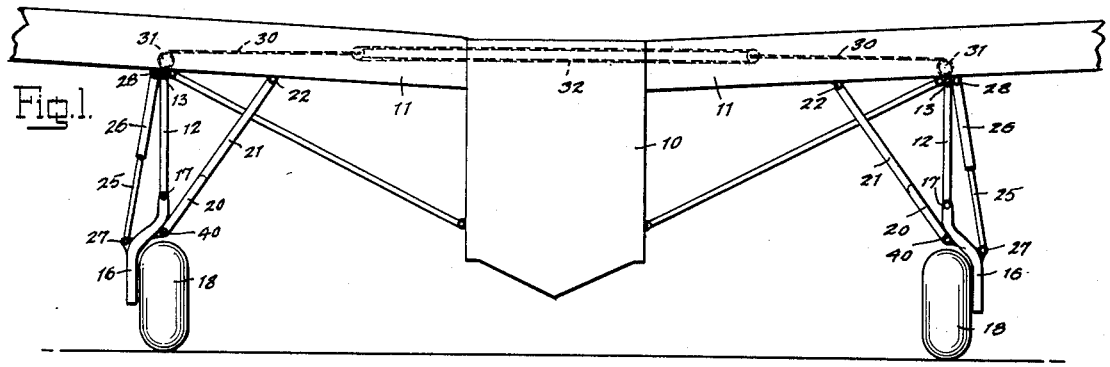
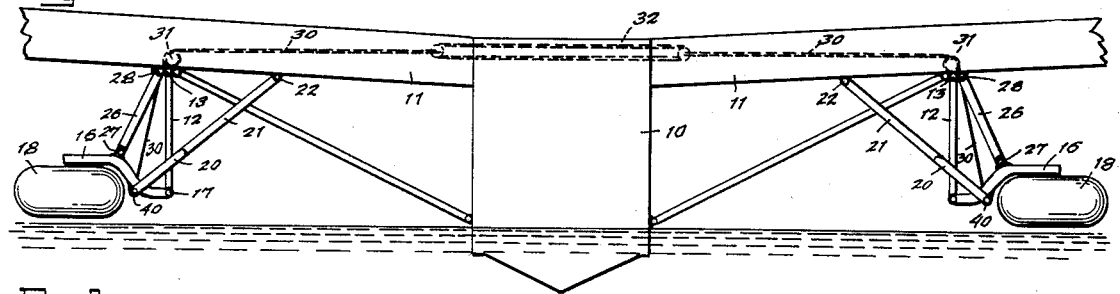
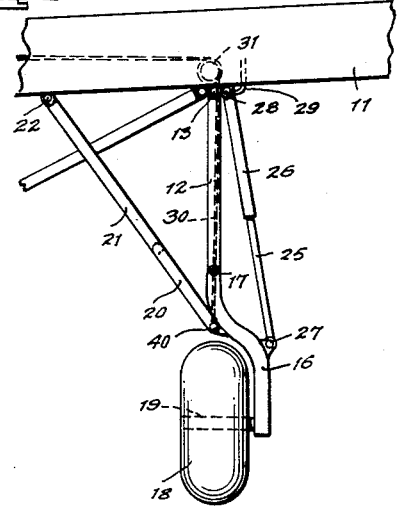
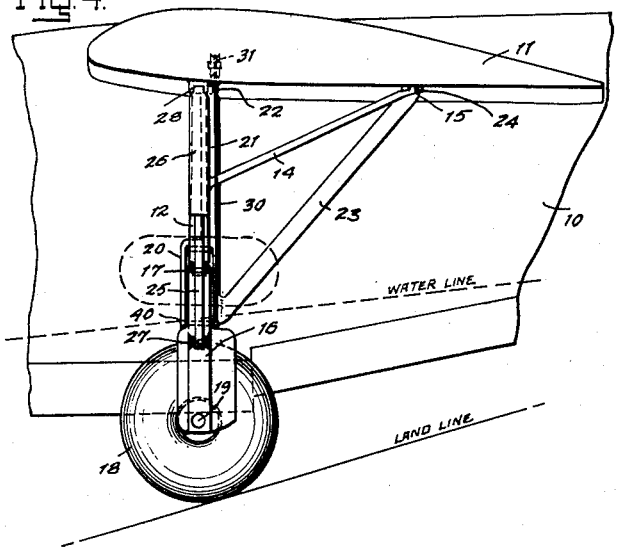
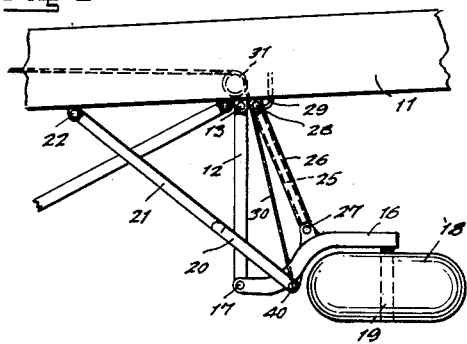
*INVENTORS*
HAROLD BOLAS AND
RUPERT JOHN GOODMAN CROUCH
BY
*ATTORNEY*

May 23, 1933.　　　H. BOLAS ET AL　　　1,910,423
AMPHIBIAN AIRCRAFT
Filed Feb. 24, 1930　　　2 Sheets-Sheet 2
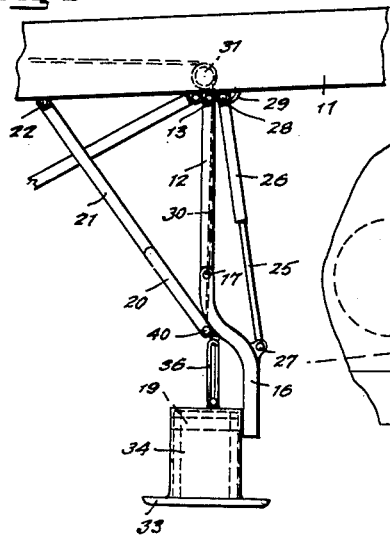
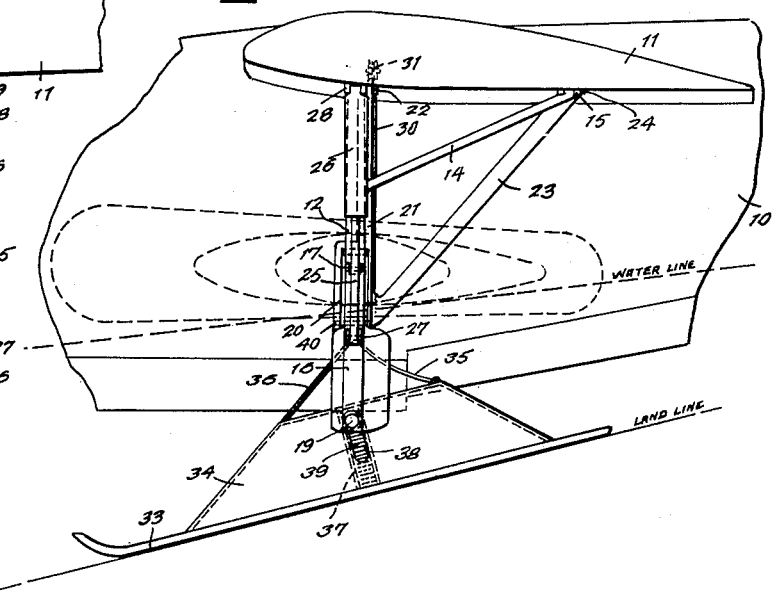
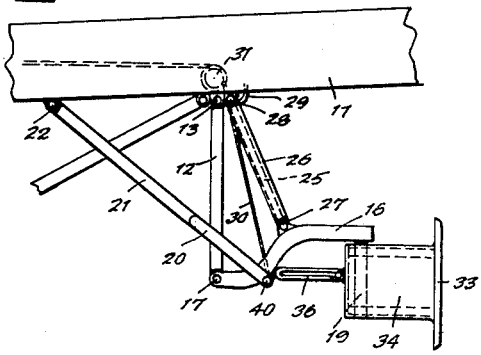
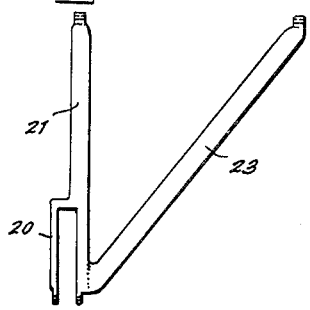
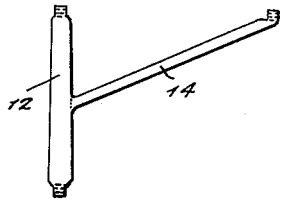
INVENTORS.
HAROLD BOLAS AND
RUPERT JOHN GOODMAN CROUCH
BY
　　　*E. Lewis Mattern.*
　　　　ATTORNEY.

Patented May 23, 1933

1,910,423

UNITED STATES PATENT OFFICE

HAROLD BOLAS AND RUPERT JOHN GOODMAN CROUCH, OF BRIDGEPORT, CONNECTICUT

AMPHIBIAN AIRCRAFT

Application filed February 24, 1930. Serial No. 430,769.

The present invention relates to improvements in amphibian aircraft, and particularly an improved under carriage adapted for alighting on, or taking off, the surface of land or water, an object being to provide such a structure in which landing means are arranged for alighting on, or taking off land surfaces, and which are adapted to be so arranged for seaplane use as to constitute lateral stabilizing wing floats.

It is usual in amphibian aircraft to provide means whereby the landing wheels can be raised or lowered by a member of the crew, this being necessary, because wheels permanently fixed in the land plane position would cause such extreme resistance, as to prohibit the machine taking off when functioning as a seaplane.

Amphibians have also been constructed in which the wheels were permanently fixed in position, the wheels in such cases being situated substantially inside the floats, a small portion only of each wheel being allowed to project below the planing bottom. It was, however, found necessary in practice to "fair" or streamline the projecting portions before the machine would leave the water, and even then the extra resistance was considerable. With wheels arranged in this way the clearance between the ground and the underside of the floats is so small that there is considerable risk of sustaining damage and the arrangement has not therefore been considered satisfactory.

In seaplanes of the central hull type, with which the present invention is principally concerned, it is customary to provide small auxiliary floats, one on each side of the main hull, the purpose of these being to maintain lateral stability when at rest on the water, or when under way at moderate speeds. Such floats are usually known as wing floats. A land under carriage was also employed in addition to these wing floats which could be drawn up clear of the water to enable the machine to operate as a seaplane.

In certain types, (e. g. Dornier), these stabilizing floats take the form of lateral extensions or stubs built out on each side of the central hull, these stubs having the wheels attached to them at their outboard extremities, and adapted to be lowered for land plane purposes, or housed inside the stub tips in more or less horizontal fashion in the seaplane case.

It is proposed in the present invention to provide an amphibian aircraft in which the usual wing floats or extension stubs are entirely dispensed with, the wheels or equivalent landing means being adapted to be used as lateral stabilizers when at rest on the water, or when under way at moderate speeds, the same being adapted to be readily moved from one position to the other at will by the occupants of the machine.

A further object is to provide a construction in which greater stability, both on land and water, is obtained, and to this end the wheels, or equivalent landing means, are arranged at a relatively greater distance apart than is ordinarily the case, so that in land use the possibility of the machine being blown over by strong cross winds is greatly reduced, and in water use the landing means and the supporting structures therefor are kept clear of the bow wave from the hull.

Another object is to provide a structure in which the change from land to water position may be accomplished in the quickest possible time, and with very small manual effort. It is also proposed to provide a structure in which the usual shock absorbing struts may be dispensed with, the wheels, or equivalent landing means, being designed to wholly assume the necessary shock absorbing.

A further object is to provide a structure in which the wheels may be readily replaced by skis, for use on ice and snow, and to this end the invention contemplates an improved ski structure, having shock absorbing characteristics, and which is adapted to serve as a stabilizing wing float for use on water.

Other objects are to provide a structure of light weight, and in which the various loads, strains and stresses imposed under flying and landing conditons are effectually taken care of.

With the above and other objects in view, an embodiment of the invention is shown in the accompanying drawings and this embodiment will be hereinafter more fully described with reference thereto, and the invention will be finally pointed out in the claims.

In the drawings:

Fig. 1 is a front elevation of an amphibian aircraft, according to the present embodiment of the invention, and showing the wheels in land use position.

Fig. 2 is a similar view, and showing the wheels in water use position.

Fig. 3 is a front elevation, enlarged, of the structure at one side, the same being in land use position.

Fig. 4 is a side elevation thereof, showing the water use position in dotted lines.

Fig. 5 is a front elevation showing the wheel in water use position.

Fig. 6 is a front elevation showing the ski mounted in place of the wheel, the same being shown in land use position.

Fig. 7 is a side elevation thereof, showing the water use position in dotted lines.

Fig. 8 is a front elevation showing the structure in water use position.

Fig. 9 is a detail plan view of the radius rod unit employed.

Fig. 10 is a detail plan view of the vertical landing strut unit employed.

Similar reference characters indicate corresponding parts throughout the several figures of the drawings.

Referring to the drawings, the amphibian aircraft illustrated comprises a hull 10 and wings 11 of conventional central hull monoplane type. The undercarriage structures at each side are identical, so that only one will be described in detail.

At a point of the under wing surface intermediate the hull and the wing tip a vertical landing strut 12 is hinged at 13 close to the forward wing spar, and is stiffened in a fore and aft direction by a diagonal rod extension 14 secured thereon and stayed to the rear wing spar, as at 15. The strut is preferably "faired" or streamlined in cross section and to its lower end is hingedly connected a wheel supporting arch member 16, the hinge 17 being of relatively wide formation in a fore and aft direction, so that it is capable of transmitting to the strut bending moments arising from fore and aft loads applied to the wheel.

The wheel 18 is preferably of the so-called Musselman type, having a large air capacity, in order to provide sufficient buoyancy as a float, while at the same time being capable of absorbing all landing shocks in itself. The wheel is mounted in cantilever fashion on the inwardly extending axle 19 secured to the lower end of the supporting arch member, the latter being so shaped that it arches over the wheel, its upper portion being in line with the strut 12, in the land use position, and the central plane of the wheel being also in the vertical plane of said strut 13 and the hinges 13 and 17. The arch member is pivotally connected at 40, also in said vertical plane, to the forked end 20 of a radius rod 21 pivoted at its upper end at 22 to the under wing surface at a point inwardly of the strut 12. An angularly extending arm 23 extends from the lower forked end of the radius rod and is pivoted at 24 to the under wing surface, the pivots 22 and 24 being in line and parallel to the hinges 17 and 40. The forked end of the radius rod is of such size as to permit the upper end of the arch member and the lower end of the landing strut to pass through it, when the structure is moved to and from the water use position, as will presently more fully appear.

While any suitable means may be employed for swinging the wheel supporting arch member from its land use position to its water use position, we preferably provide a telescoping piston rod and cylinder 25, 26, pivoted at its lower end at 27 to the outer side of the arch member and at its upper end at 28 to the under wing surface adjacent the hinge 13, hydraulic pressure being employed in the cylinder to project or retract the rod. A flexible duct 29 connected to the cylinder extends to suitable hydraulic control means in the pilot's cabin. The pressure in the system is utilized in the land use position to constitute the piston rod and cylinder a rigid strut.

In order to balance the weight of the wheels and gear, cables 30 are secured to the radius rod units at their lower ends, at the pivot points 40, passing upwards over pulleys 31 mounted inside the wing, and are connected to one another by means of a long tension rubber or spring 32 of sufficient strength to balance the weights of the wheels. The static balance of this arrangement is almost perfect throughout its range, and hence the manual loads required to operate the gear in the air are quite light. It thus follows that a high gear could be employed between the hand and wheel and the process of raising and lowering the wheels executed with great facility and speed.

In moving from the land use position, Figs. 1 and 3, to the water use position, Figs. 2 and 4, the wheels swing through 90° about the center 40, and in addition are further raised by a distance corresponding to the vertical distance between the centers 40 and 17. In this way bending moments on the gear arising from fore and aft loads at the wheel are reduced to a minimum, while allowing the wheel a large upward travel. In the raised or water use position the wheels are moved outboard to a considerable extent thus improving water stability.

The relatively large vertical movement of the wheels is such that they will be clear of the water in the water use or seaplane position, while furnishing ample ground clearance for the hull bottom in the land use position.

In Figs. 6 to 8 we have shown the wheels replaced by skis, to allow of operation from a surface consisting of snow or ice. To this end it is merely necessary to remove each wheel from its axle and replace it by a ski unit, all other parts remaining the same. The ski units, according to our invention, are provided with shock absorbing means, and are also buoyant, so that they will function as landing gears and stabilizing floats in substantially the same manner as the wheels they replace.

The ski proper 33 is surmounted by a streamlined watertight compartment 34 to which the ski is rigidly attached. The unit, when mounted on the axle, is free to rotate around the latter between limits imposed by a cable 35 and an extensible spring member 36. The ski is thus enabled to take up its proper attitude whether the tail of the machine is on the ground or raised as in taking off. In practice the cable 35 and spring member 36 are so designed as to hold the ski at a given position when in flight.

A vertically disposed space 37 is provided in the compartment 34 between its bulkheads, slots 38 being provided at each side in which the axle 19 is engaged. Between the axle and the lower end of the space there are provided shock absorbing springs or compression rubbers 39, which act between the ski and the arch member 16 to take up shock on landing, the spring member 36 slacking off when the compression springs or rubbers are compressed, becoming operative again as soon as the lift on the wings removes the load.

It will be observed that in the raised or water use position, Fig. 8 and dotted lines Fig. 7, with the machine afloat, a certain portion of the rear end of each ski becomes submerged, so that when under way on the water these portions act as rudders and serve to hold the skis in position. The streamlined compartments 34 now act as wing floats and provide the necessary stability when at rest on the water, or when under way at relatively slow speeds.

We have illustrated and described a preferred and satisfactory embodiment of the invention, but it will be obvious that changes may be made therein, within the spirit and scope thereof, as defined in the appended claims.

Having thus described our invention, what we claim and desire to secure by Letters Patent is:—

1. In amphibian aircraft, a substantially vertically disposed strut connected at its upper end to the aircraft, a swinging member hinged to the lower end of said strut, a ground engaging element having buoyancy and carried by said swinging member, a longitudinally rigid diagonally disposed member hinged at its upper end to the aircraft and hinged at its lower end to said swinging member, and means for swinging said swinging member to constitute said ground engaging element a stabilizing float.

2. The invention as claimed in claim 1, further characterized in that said strut member and the hinge of said diagonal member are in a substantially vertical plane in one position of said swinging member, and the lower hinges of said swinging member and said diagonal member are in a plane substantially at a right angle to said vertical plane in the other position of said swinging member.

3. In amphibian aircraft a buoyant hull adapted to float the aircraft on water, a ground engaging ski, having buoyant bulkhead means, means for supporting the same upon the aircraft, shock absorbing means interposed between said ski and said last mentioned means, and means for moving said ski to a relatively lateral position to constitute a stabilizing float.

4. In amphibian aircraft, a ground engaging buoyant ski, means pivotally supporting the same upon the aircraft to swing about a horizontal axis, means for moving said ski to a relatively lateral position to constitute a stabilizing float, said pivotal axis being substantially in a vertical plane in said lateral position, and trailing rudder means adapted to guide the direction of said ski in the water.

5. In amphibian aircraft, a substantially vertically disposed strut hinged at its upper end to the aircraft, a swinging member hinged to the lower end of said strut, a ground engaging element having buoyancy and carried by said swinging member, a longitudinally rigid diagonally disposed member hinged at its upper end to the aircraft and hinged at its lower end to said swinging member, and longitudinally extensible means for swinging said swinging member to constitute said ground engaging element a stabilizing float.

6. In amphibian aircraft, a central buoyant hull adapted of itself to float the aircraft on water, buoyant landing wheels in outwardly separated relation to said hull at each side, means for supporting said wheels upon the aircraft to engage the ground in a plane appreciably below the lowest part of said hull and in an approximately upright position to the ground, and means for swinging the axes of said wheels to a raised position to bring said wheels into an approximately lateral plane appreciably above the lowest part of the hull whereby said wheels are adapted to directly engage the water after an appreciable submergence of said hull to constitute stabilizing floats outwardly spaced from said hull at each side, said wheels being out of contact with the water in said raised position upon initial contact of said hull with the water upon alighting.

7. In amphibian aircraft, a central buoyant hull adapted of itself to float the aircraft on water, inherently resilient buoyant landing wheels in outwardly separated relation to said hull at each side, means for supporting said wheels upon the aircraft to engage the ground in a plane appreciably below the lowest part of said hull and in an approximately upright position to the ground, and means for swinging the axes of said wheels to a raised position to bring said wheels into an approximately lateral plane appreciably above the lowest part of the hull whereby said wheels are adapted to directly engage the water after an appreciable submergence of said hull to constitute stabilizing floats outwardly spaced from said hull at each side, said wheels being out of contact with the water in said raised position upon initial contact of said hull with the water upon alighting.

8. In amphibian aircraft, a central buoyant hull adapted of itself to float the aircraft on water, buoyant landing skis in outwardly separated relation to said hull at each side, means for supporting said skis upon the aircraft to engage the ground in a plane appreciably below the lowest part of said hull and in an approximately upright position to the ground, and means for swinging said skis to a raised position to bring them into a plane appreciably above the lowest part of the hull whereby said skis are adapted to directly engage the water after an appreciable submergence of said hull to constitute stabilizing floats outwardly spaced from said hull at each side, said skis being out of contact with the water in said raised position upon initial contact of said hull with the water upon alighting.

Signed at Bridgeport, county of Fairfield, and State of Connecticut, this 21st day of February, 1930.

HAROLD BOLAS.
RUPERT JOHN GOODMAN CROUCH.